(12) United States Patent
Li et al.

(10) Patent No.: US 10,193,634 B2
(45) Date of Patent: Jan. 29, 2019

(54) OPTICAL DRIVER CIRCUITS

(71) Applicant: HEWLETT PACKARD ENTERPRISE DEVELOPMENT LP, Houston, TX (US)

(72) Inventors: Cheng Li, Palo Alto, CA (US); Di Liang, Palo Alto, CA (US); Kehan Zhu, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/269,542

(22) Filed: Sep. 19, 2016

(65) Prior Publication Data

US 2018/0083711 A1 Mar. 22, 2018

(51) Int. Cl.

| H04B 10/564 | (2013.01) |
| H04L 27/01 | (2006.01) |
| H04B 10/54 | (2013.01) |
| H04L 25/02 | (2006.01) |
| H04L 25/03 | (2006.01) |
| H04B 10/80 | (2013.01) |

(52) U.S. Cl.
CPC ......... *H04B 10/564* (2013.01); *H04B 10/541* (2013.01); *H04L 25/028* (2013.01); *H04L 25/03885* (2013.01); *H04L 27/01* (2013.01); *H04B 10/801* (2013.01)

(58) Field of Classification Search
CPC combination set(s) only.
See application file for complete search history.

(56) References Cited

U.S. PATENT DOCUMENTS 4,408,330 A 10/1983 An
5,764,670 A 6/1998 Ouchi
(Continued)

FOREIGN PATENT DOCUMENTS

CN 1476132 A 2/2004
JP 2005093742 A 4/2005
(Continued)

OTHER PUBLICATIONS

Goyal, P. et al., "A Review on High Speed and Low Power CMOS Optical Interconnects," (Research Paper), International Journal of Computer Networks and Wireless Communications (IJCNWC) 6.1, Jan.-Feb. 2016.
(Continued)

*Primary Examiner* — David Payne
*Assistant Examiner* — Omar S Ismail
(74) *Attorney, Agent, or Firm* — Hewlett Packard Enterprise Patent Department

(57) ABSTRACT

Examples disclosed herein relate to optical driver circuits. In some of the disclosed examples, an optical driver circuit includes a pre-driver circuit and a main driver circuit. The pre-driver circuit may include a pattern generator and at least one serializer to generate a main modulation signal and an inverted delayed modulation signal. The main driver circuit may include a level controller to control amplitudes of pre-emphasis on rising and falling edges of a modulation signal output and an equalization controller to transition the modulation signal output from the pre-emphasis amplitudes to main modulation amplitudes using the inverted delayed modulation signal.

20 Claims, 6 Drawing Sheets

(56) References Cited

U.S. PATENT DOCUMENTS

| | | | |
|---|---|---|---|
| 6,288,426 B1 | 9/2001 | Gauthier, Jr. et al. | |
| 6,437,372 B1 | 8/2002 | Geva et al. | |
| 6,492,283 B2 | 12/2002 | Raaijmakers | |
| 6,493,476 B2 | 12/2002 | Bendett | |
| 6,515,333 B1 | 2/2003 | Riccobene | |
| 6,526,083 B1 | 2/2003 | Kneissl et al. | |
| 6,585,424 B2 | 7/2003 | Chason | |
| 6,706,581 B1 | 4/2004 | Hou et al. | |
| 6,849,866 B2 | 2/2005 | Taylor | |
| 6,902,987 B1 | 6/2005 | Tong | |
| 7,639,719 B2 | 12/2009 | Fang et al. | |
| 7,817,881 B2 | 10/2010 | Li | |
| 7,869,473 B2 | 1/2011 | Ye et al. | |
| 7,949,210 B2 | 5/2011 | Durfee et al. | |
| 8,078,018 B2 | 12/2011 | Mouli | |
| 8,372,673 B2 | 2/2013 | Lee et al. | |
| 8,664,087 B2 | 3/2014 | Chang et al. | |
| 8,716,852 B2 | 5/2014 | Shu et al. | |
| 8,937,981 B2 | 1/2015 | Liang | |
| 9,018,675 B2 | 4/2015 | Bedell et al. | |
| 9,048,954 B2 | 6/2015 | Rylyakov et al. | |
| 9,093,428 B2 | 7/2015 | Liang | |
| 2002/0113288 A1 | 8/2002 | Clevenger et al. | |
| 2002/0167693 A1 | 11/2002 | Vrazel et al. | |
| 2002/0168837 A1 | 11/2002 | Hsu et al. | |
| 2003/0006407 A1 | 1/2003 | Taylor | |
| 2003/0081642 A1 | 5/2003 | Hwang et al. | |
| 2003/0169791 A1 | 9/2003 | Chou | |
| 2004/0264530 A1 | 12/2004 | Ryou et al. | |
| 2006/0035450 A1 | 2/2006 | Frank et al. | |
| 2007/0116075 A1* | 5/2007 | Fujita | G11B 7/126 372/38.04 |
| 2009/0080488 A1 | 3/2009 | Hatakeyama et al. | |
| 2009/0168821 A1 | 7/2009 | Fang et al. | |
| 2009/0194152 A1 | 8/2009 | Liu et al. | |
| 2009/0290621 A1* | 11/2009 | Okamura | H04L 1/205 375/219 |
| 2010/0215309 A1 | 8/2010 | Shubin et al. | |
| 2011/0064099 A1 | 3/2011 | Govorkov et al. | |
| 2011/0073989 A1 | 3/2011 | Rong et al. | |
| 2011/0293216 A1 | 12/2011 | Lipson et al. | |
| 2012/0119258 A1 | 5/2012 | Liang | |
| 2012/0235727 A1 | 9/2012 | Oku et al. | |
| 2015/0207570 A1* | 7/2015 | Renaudier | H04B 10/504 398/140 |
| 2016/0013614 A1* | 1/2016 | Moto | H01S 5/0427 372/38.02 |

FOREIGN PATENT DOCUMENTS

| | | |
|---|---|---|
| JP | 2010278396 | 12/2010 |
| WO | WO-2013066318 A1 | 5/2013 |
| WO | WO-2013165376 A1 | 11/2013 |
| WO | WO-2014021781 A1 | 2/2014 |
| WO | WO-2016018285 A1 | 2/2016 |
| WO | WO-2016122547 | 8/2016 |

OTHER PUBLICATIONS

Ohhata, K. et al., "Design of a 4×10 Gb/s VCSEL Driver Using Asymmetric Emphasis Technique in 90-nm CMOS for Optical Interconnection," (Research Paper), Microwave Theory and Techniques, IEEE Transactions on 58.5, May 2010, pp. 1107-1115.
Palermo, S., "Design of High-speed Optical Interconnect Transceivers," (Research Paper), Diss. Stanford University, Sep. 2007, 174 pages, available at https://vlsiweb.stanford.edu/people/alum/pdf/0709_Palermo_Optical_Link.pdf.
Song, Y-H et al., "A 6-Gbit/s Hybrid Voltage-Mode Transmitter With Current-Mode Equalization in 90-nm CMOS," (Research Paper), Circuits and Systems II: Express Briefs, IEEE Transactions on 59.8, Aug. 2012, pp. 491-495.
Amarnat, K., "Active Microring and Microdisk Optical Resonators on Indium Phosphide," (Research Paper), 2006, available at http://drum.lib.umd.edu/bitstream/1903/3513/1/umi-umd-3343.pdf.
Chen, X., et al.; "Active Transmission Control Based on Photonic-Crystal MOS Capacitor"; Jan. 23, 2007; pp. 1-9.
Dai, D. et al., "Hip Speed Modulation of Hybrid Silicon Evanescent Lasers," Integrated Photonics and Nanophotonics Research and Applications, Optical Society of America, Jul. 12, 2009, 3 pages.
European Search Report received in EP Application No. 11875113.0, dated Jul. 30, 2015, 3 pages.
Extended European Search Report received in EP Application No. 11871524.2, dated Jul. 16, 2015, 9 pages.
Fan, Y-Y., et al; "Impact of Interfacial Layer and Transition Region on Gate Current Performance for High-K Gate Dielectric Stack: Its Tradeoff With Gate Capacitance,"; Feb. 2003; pp. 433-439.
Heck, M. J. R., et al.; "Hybrid Silicon Photonics for Optical Interconnects"; Aug. 13, 2010; pp. 1-14.
International Search Report & Written Opinion received in PCT Application No. PCT/US2011/050083, dated May 1, 2012, 7 pages.
International Search Report, dated Aug. 27, 2012, PCT Application No. PCT/US2011/058756, Korean Intellectual Property Office.
Jeong, Y-K. et al.; "High Quality High-k MIM Capacitor by Ta2O5/HfO2/Ta2O5 Multi-layered Dielectric and NH3 Plasma Interface Treatments for Mixed-Signal/RF Applications,"; Jun. 15-17, 2004; pp. 222-223.
Kissinger et al., "Void-free Silicon-wafer-bend strengthening in the 200-400 ° C. range", Sens. Actuators. A 36, 1993, pp. 149-156.
Li, J.; "Wafer Scale Flexible Interconnect Fabrication for Heterogeneous Integration"; Oct. 26, 2015; 94 pages.
Liang et al, "Highly efficient vertical outgassing channels for low-temperature InP-to-silicon direct wafer bonding on the silicon-on-insulator substrate"; 2008; pp. 1560-1568.
Liu, A. et al., "High-Speed Optical Modulation Based on Carrier Depletion in a Silicon Waveguide," Optics Express, vol. 15, No. 2, Jan. 22, 2007, pp. 660-668.
Liu, A.; et al., "A High-Speed Silicon Optical Modulator Based on a Metal—Oxide—Semiconductor Capacitor," Nature 427, Feb. 12, 2004, Nature Publishing Group, pp. 615-618.
Marris-Morini, D. et al., "D006—State of the Art on Photonics on CMOS," (Research Paper), Nov. 30, 2009, available at http://www.helios-project.eu/content/download/326/2147/file/HELIOS_D006.pdf.
Morthier, G. et al., "Microdisk Lasers Heterogeneously Integrated on Silicon for Low-power, High-speed Optical Switching," (Research Paper), IEEE Photonics Society Newsletter, vol. 24, No. 3, Jun. 2010, pp. 5-10, available at http://lecture.ecc.u-tokyo.ac.jp/~tlecwada/Optics%20&%20Photonics/presentation%20files/paper9.pdf.
PCT/ISA/KR, International Search Report, dated Apr. 22, 2015; PCT/US2014/048818.
Sysak, M. N. et al., "Hybrid Silicon Laser Technology: A Thermal Perspective," Selected Topics in Quantum Electronics, IEEE Journal of 17.6, 2011, pp. 1490-1498, available at http://optoelectronics.ece.ucsb.edu/sites/default/files/publications/1195_Sysak_JSTQ_2011J.pdf.

* cited by examiner

OPTICAL DRIVER CIRCUITS

STATEMENT OF GOVERNMENT INTEREST

This invention was made with government support under Contract No. H98230-12-C-0236, awarded by Maryland Procurement Office. The government has certain rights in the invention.

BACKGROUND

Optical interconnects may be used in data transmission links to transmit data at high speeds. An optical interconnect may include an optical transmitter that transmits a modulated signal through a transmission medium, such as an optical fiber, and an optical receiver that receives the modulated signal.

BRIEF DESCRIPTION OF THE DRAWINGS

The following detailed description references the drawings, wherein.

DETAILED DESCRIPTION

Figure 1:
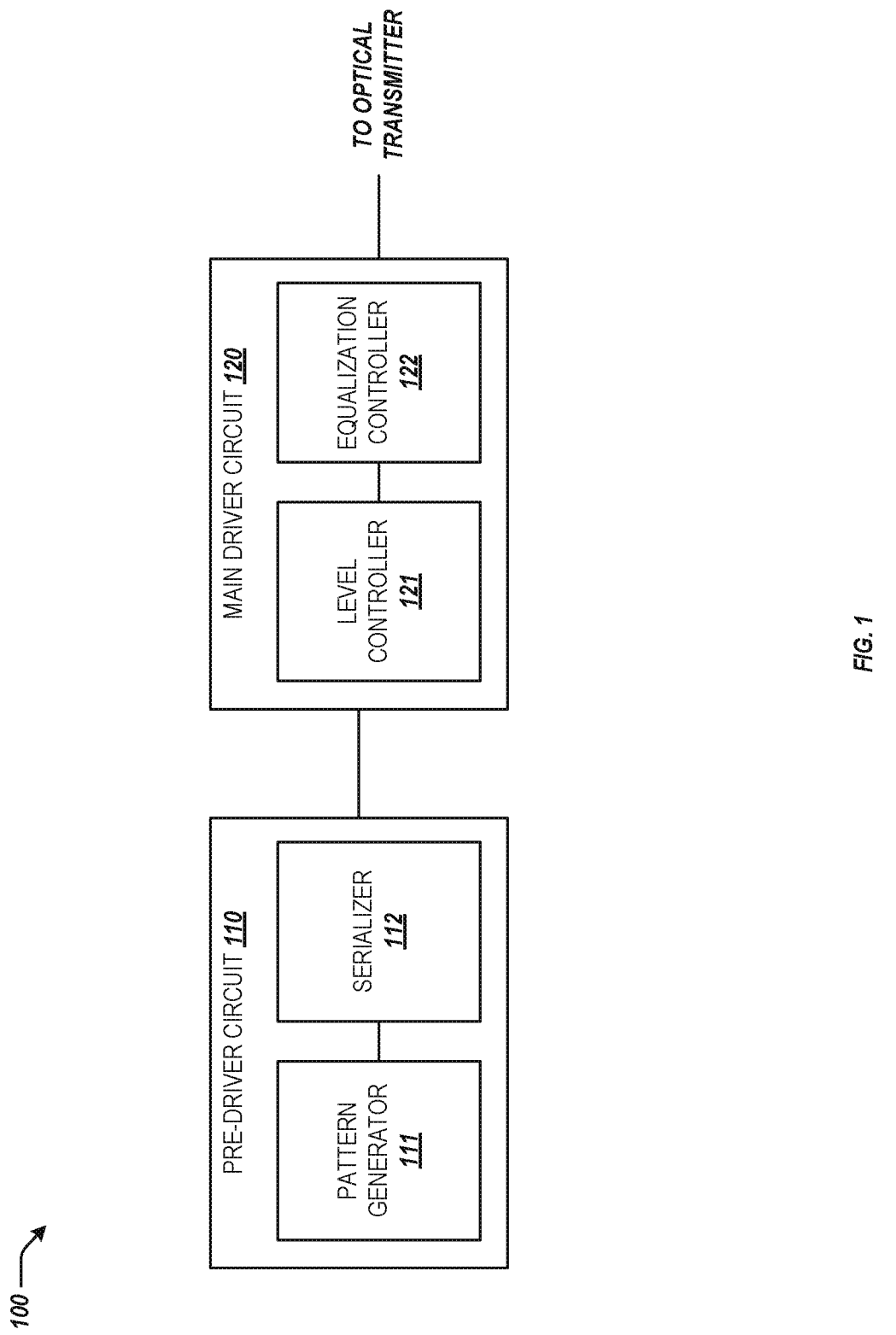
FIG. 1 is a block diagram of an example optical driver circuit.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

An optical transmitter may be connected to a driver circuit that receives a data stream of logic bits (e.g., a digital stream of 1's and 0's), generates a modulated signal encoded with the bits from the data stream, and provides the modulated signal output to the optical transmitter for transmission across a transmission medium. An optical receiver may include a photodetector that receives the modulated signal, decodes the data bits in the modulated signal, and generates an electrical current representing the decoded data bits.

In some implementations, signal distortions may be introduced into modulated signals as they are generated, transmitted, and received. The distortions may cause errors in the decoding process at the optical receiver, which in turn results in errors and/or loss of data.

Examples disclosed herein provide technical solutions to these technical challenges by providing optical driver circuits and methods for generating modulation signal outputs of optical driver circuits. In some of the examples disclosed herein, an optical driver circuit may prevent the degradation of signal integrity at the optical receiver by introducing a pre-emphasis on the rising and falling edges of the modulated signal. The pre-emphasis may cause the rising and falling edges to overshoot the normal modulation amplitude of the modulation signal to compensate for distortions, such as inter-symbol interference (ISI), in the modulated signal that occur as it is transmitted, thereby allowing the optical interconnect to operate at higher speeds. The initial pre-emphasis on the rising and falling edges of the modulated signal may be removed by equalization to achieve the normal modulation amplitude of the signal.

FIG. 1 is a block diagram of an example optical driver circuit 100. As shown in FIG. 1, optical driver circuit 100 circuit may include a pre-driver circuit 110 and a main driver circuit 120 connected to an optical transmitter. The number and arrangement of these components is an example only and provided for purposes of illustration. Other arrangements and numbers of components may be utilized without departing from the examples of the present disclosure.

Pre-driver circuit 110 and main driver circuit 120 may be each implemented by electronic circuitry and/or a combination of electronic circuitry and software (e.g., executable instructions stored on a machine-readable medium) executable by the electronic circuitry. Pre-driver circuit 110 may include a pattern generator 111 and at least one serializer 112 while main driver circuit 120 may include a level controller 121 and an equalization controller 122. Components 110, 111, 121, and 122 may be implemented similarly by electronic circuitry and/or a combination of electronic circuitry and software executable by the electronic circuitry as pre-driver circuit 110 and main driver circuit 120.

Pattern generator 111 may be a pseudorandom binary sequence generator that generates modulation signals representing sequences of bits (1's and 0's) based on a set of seed values. The maximum number of bits in a binary sequence generated by pattern generator 111 may be defined as $N=2^n-1$, where N is the maximum number of bits and n is the size of a unique word of data in the sequence.

Pattern generator 111 may provide the generated modulation signals to serializer 112. Serializer 112 may combine generated modulation signals, thereby serializing the generated modulation signals. Serializer 112 may serialize generated modulation signals by interleaving bits included in various generated modulation signals to form combined modulation signals. Interleaving modulation signals may produce combined modulation signals that operate at faster speeds compared to the modulation signals generated by pattern generator 111. For example, pattern generator 111 may generate eight modulation signals each operating at 2 GHz. Serializer 112 may combine pairs of the eight modulation signals into four combined modulation signals each operating at 4 GHz using bit interleaving. In addition to serializing modulation signals generated by pattern generator 111, serializer 112 may generate inverted serialized modulation signals as well as delayed serialized modulation signals. The main, inverted, and delayed serialized modulation signals may be used by main driver circuit 120 to control aspects of modulation signals provided to optical transmitters.

Pre-driver circuit 110 may provide modulation signals to main driver circuit 120. The provided modulation signals may be modulation signals generated by pattern generator 111 and serialized by serializer 112. The provided modulation signals may be fed into various controllers of main driver circuit 120, such as level controller 121 and equalization controller 122. In some examples, main driver circuit may also include an edge rate controller. The controllers included in main driver circuit 120 may control various aspects of modulation signal outputs provided from main driver 120 to the optical transmitter. Level controller 121 may control the signal swing (i.e., the minimum and maximum amplitudes) of modulation signal outputs whereas equalization controller 122 may control the normal modulation amplitudes of modulation signal outputs. The edge rate controller, when included in main driver circuit 120, may control the speed of modulation (i.e., the rise time and fall time) of modulation signal outputs.

Level controller 121 and equalization controller 122 may work in combination to control pre-emphasis on modulation signal outputs provided to optical transmitters. Pre-emphasis may be defined as a temporary overshoot of a modulation signal output's normal modulation amplitude on the rising and/or falling edges of the modulation signal output. For example, a modulation signal output may transition from low (logic 0) to high (logic 1) at 40 mA maximum amplitude and then drop down to a normal modulation amplitude of 35 mA. As another example, a modulation signal output may transition from high (logic 1) to low (logic 0) at 15 mA maximum amplitude and then rise up to a normal modulation amplitude of 20 mA. In the above examples, the periods where the amplitude of the modulation signal is between 35 mA and 40 mA and between 15 mA and 20 mA may be referred to as pre-emphasis. To control pre-emphasis, level controller 121 may control amplitudes of pre-emphasis on rising and falling edges of the modulation signal output while equalization controller 122 controls the transition of the modulation signal output from the pre-emphasis amplitudes to main modulation amplitudes.

Figure 2:
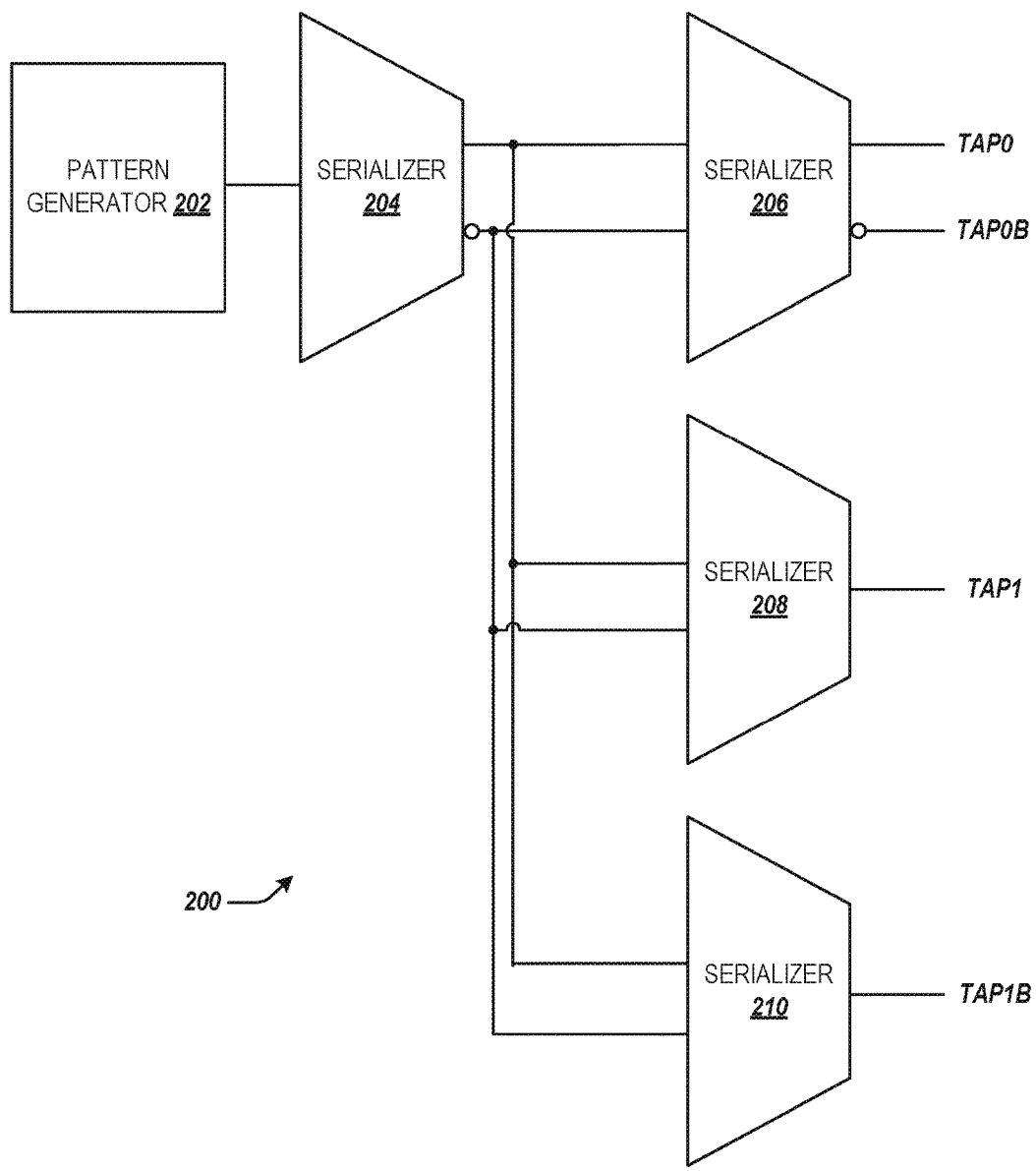
FIG. 2 is a block diagram of an example pre-driver circuit of an optical driver circuit.

FIG. 2 is a block diagram of an example pre-driver circuit 200. In some examples, pre-driver circuit 200 may be included in an optical driver circuit such as optical driver circuit 100 of FIG. 1. For example, pre-driver circuit 200 may be used to implement pre-driver circuit 110 of optical driver circuit 100.

As shown in FIG. 2, pre-driver circuit 100 circuit may include a pattern generator 202 and a plurality of serializers 204-210. The number and arrangement of these components is an example only and provided for purposes of illustration. Other arrangements and numbers of components may be utilized without departing from the examples of the present disclosure.

Pattern generator 202 may be used to implement pattern generator 111. Pattern generator 202 may receive incoming logic streams (e.g., sequences of 1's and 0's) and may convert the logic streams into a plurality of initial modulation signals. Serializers 204-210 may be used to implement serializer 112. Serializer 204 may combine initial modulation signals into a plurality of intermediate modulation signals using bit interleaving or other serialization techniques.

Serializers 206-210 may be tapped off of the output of serializer 204. Serializer 206 may combine the plurality of intermediate modulation signals into a main modulation signal TAP0 and an inverted main modulation signal TAP0B. Serializer 208 may combine the plurality of intermediate modulation signals and delay the combined intermediate modulation signals, thereby generating a delayed modulation signal TAP1. Serializer 210 may combine the plurality of intermediate modulation signals, delay the combined intermediate modulation signals, and invert the delayed combination of intermediate modulation signals, thereby generating an inverted delayed main modulation signal TAP1B. In some examples, serializer 208 and 210 may implement the delays using clock phase shifts. In some examples, the delays implemented by serializer 208 and 210 may be one clock cycle. Accordingly, the delayed main modulation signal TAP1 may be 180 degrees phase shifted from the main modulation signal TAP0 and the inverted delayed main modulation signal TAP1B may be 180 degrees phase shifted from the main modulation signal TAP0.

To illustrate an example implementation of pre-driver circuit 200, pattern generator 202 may generate eight parallel initial modulation signals operating at 2 GHz each. Serializer 204 may combine the eight parallel initial modulation signals into four pairs of intermediate modulation signals, each operating at 4 GHz. Serializer 206 may combine the four pairs of intermediate modulation signals into one modulation signal (e.g., the main modulation signal TAP0) operating at 16 GHz and may invert the modulation signal to generate the delayed main modulation signal TAP0B also operating at 16 GHz. Serializer 208 may combine the four pairs of intermediate modulation signals into one modulation signal and delay the signal by one clock cycle from the main modulation signal TAP0 to generate the delayed main modulation signal TAP1 operating at 16 GHz. Serializer 210 may combine the four pairs of intermediate modulation signals into one modulation signal, delay the signal by one clock cycle from the main modulation signal TAP0, and invert the signal to generate the inverted delayed main modulation signal TAP0B operating at 16 GHz.

Figure 3:
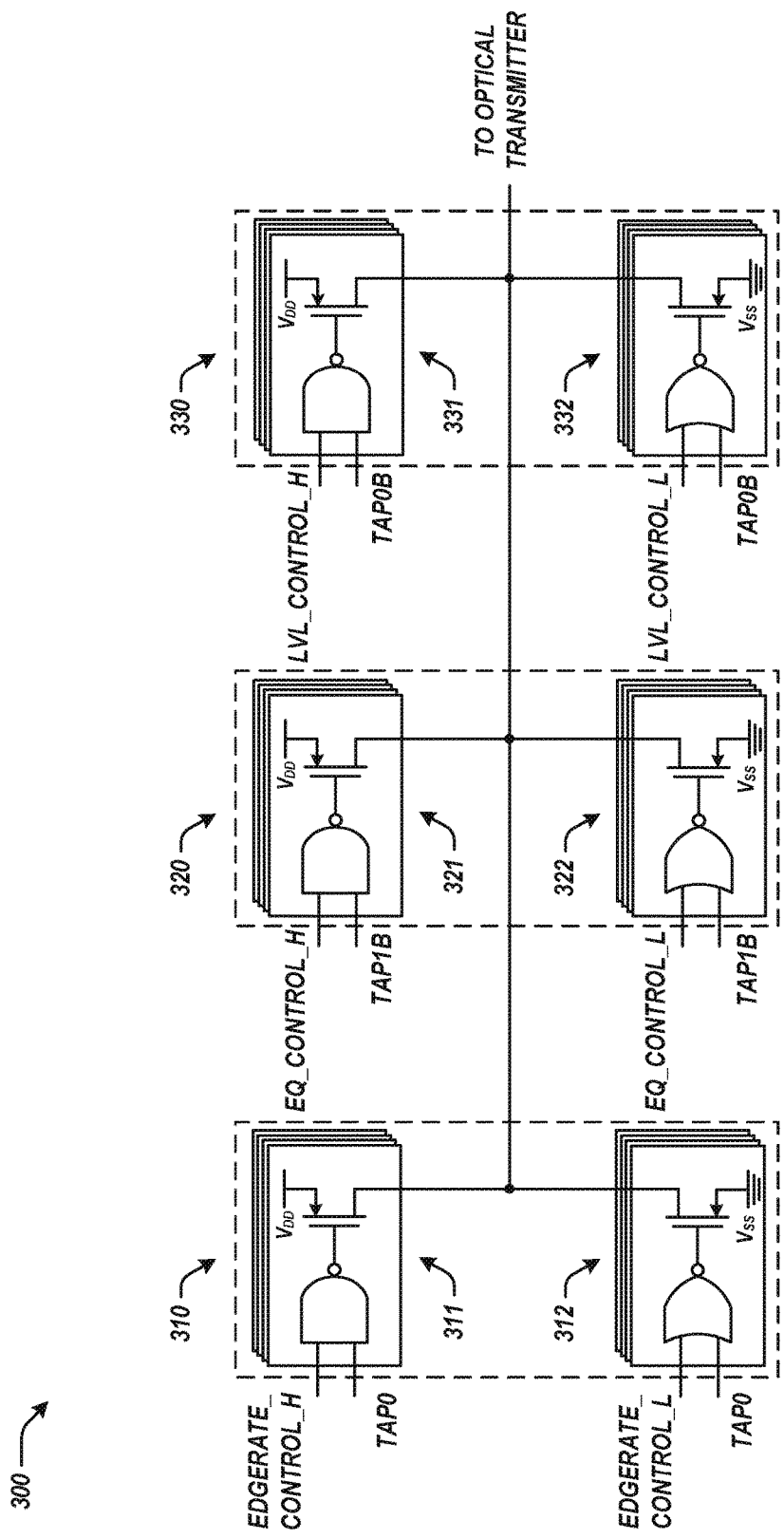
FIG. 3 is a block diagram of an example main driver circuit of an optical driver circuit.

FIG. 3 is a block diagram of an example main driver circuit 300. In some examples, main driver circuit 300 may be used to implement main driver circuit 120 of FIG. 1. As shown in FIG. 3, main driver circuit 300 may include an edge rate controller 310, an equalization controller 320, and a level controller 330 connected to an optical transmitter. The number and arrangement of these components is an example only and provided for purposes of illustration. Other arrangements and numbers of components may be utilized without departing from the examples of the present disclosure.

Edge rate controller 310, equalization controller 320, and level controller 330 may be used to control aspects of modulation signals outputted to the optical transmitter. The optical transmitter may be any optical transmitter capable of receiving an electrical input, such as a modulation signal output generated by main driver circuit 300, and converting the electrical input to an optical output. Example optical transmitters include various types of lasers, such as ring lasers, laser diodes (e.g., vertical-cavity surface-emitting lasers), etc.

Edge rate controller 310, equalization controller 320, and level controller 330 each may include a plurality of negative-AND (NAND) gate p-channel metal-oxide-semiconductor field-effect transistor (PMOS) circuits connected to a $V_{DD}$ (e.g., NAND gate PMOS circuits 311, 321, and 331) and a plurality of negative-OR (NOR) gate n-channel metal-oxide-semiconductor field-effect transistor (NMOS) circuits connected to a $V_{SS}$ or ground (e.g., NOR gate NMOS circuits 312, 322, and 332). While FIG. 3 shows each of the plurality of NAND gate PMOS circuits and NOR gate NMOS circuits including four circuits each, each plurality may include any number of NAND gate PMOS circuits and NOR gate NMOS circuits.

NAND gate with PMOS pull up circuits 311, 321, and 331 and NOR gate with NMOS pull down circuits 312, 322, and 332 may collectively form a voltage divider that controls the modulation signal output to optical transmitter 340 (e.g., the modulation signal output to a cathode of optical transmitter 340). The various signals that feed into edge rate controller 310, equalization controller 320, and level controller 330 may be used to control the voltage divider. EDGERATE_CONTROLL_H in conjunction with TAP0 (e.g., TAP0 from pre-driver circuit 200) may be used to turn on and off ones of the plurality of NAND gate PMOS circuits 311 and EDGERATE_CONTROLL_L in conjunction with TAP0 may be used to turn on and off ones of the plurality of NOR gate NMOS circuits 312. EQ_CONTROL_H and TAP1B (e.g., TAP1B from pre-driver circuit 200) may similarly control NAND gate PMOS circuits 321, EQ_CONTROL_L and TAP1B may similarly control NOR gate NMOS circuits 322, LVL_CONTROL_H and TAP0B (e.g., TAP0B from pre-driver circuit 200) may similarly control NAND gate PMOS circuits 331, and LVL_CONTROL_L and TAP0B may similarly control NOR gate NMOS circuits 332. In some examples, TAP1 from pre-driver circuit 200 may not be connected. Turning various NAND gate PMOS circuits and NOR gate NMOS circuits on and off may change the resistances in the voltage divider, which in turn changes the voltage of the modulation signal output to optical transmitter 340.

In operation, edge rate controller 310 may be controlled by main modulation signal TAP0 and level controller 330 may be controlled by inverted modulation signal TAP0B. Accordingly, when TAP0 is at logic 1 (and thus TAP0B is at logic 0), EDGERATE_CONTROL_H will be able to control NAND gate PMOS circuits 311 (e.g., turn on ones of NAND gate PMOS circuits 311 by setting EDGERATE_CONTROL_H inputs on those circuits to 1) and LVL_CONTROL_L will be able to control NOR gate NMOS circuits 332 (e.g., turn on ones of NOR gate NMOS circuits 332 by setting LVL_CONTROL_L inputs on those circuits to 0) simultaneously. Turning on ones of NAND gate PMOS circuits 311 may charge the modulation signal output to optical transmitter 340 up to $V_{DD}$ whereas the modulation level may be pulled down by turning on ones of NOR gate NMOS circuits 332. Conversely, when TAP0 is at logic 0 (and thus TAP0B is at logic 1), EDGERATE_CONTROL_L will be able to control NOR gate NMOS circuits 312 and LVL_CONTROL_H will be able to control NAND gate PMOS circuits 321 simultaneously. Turning on ones of NOR gate NMOS circuits 312 may discharge the modulation signal output to optical transmitter 340 down to $V_{SS}$ whereas the modulation level may be pulled up slightly by turning on ones of NAND gate PMOS circuits 331.

Equalization controller 320 may remove pre-emphasis of the modulation signal output to optical transmitter 340 (e.g., may transition the modulation signal output amplitude from the pre-emphasis amplitude to a normal/main modulation amplitude) using two-tap feed forward equalization by combining the main modulation signal TAP0 with inverted one-clock-cycle delayed main modulation signal TAP1B in the time domain. The equalization on the rising and falling edges of the modulation signal output to optical transmitter 340 may be controlled independently with NAND gate PMOS circuits 321 and NOR gate NMOS circuits 322, respectively. For example, for transmission of two or more consecutive 1 bits on the main modulation signal TAP0 (e.g., TAP0 previous bit 1, TAP0 current bit 1, and TAP1B current bit 0), EDGERATE_CONTROL_H will be able to control NAND gate PMOS circuits 311 of edge rate controller 310 and EQ_CONTROL_L will be able to control NOR gate NMOS circuits 322 of equalization controller 320 simultaneously. The voltage divider resistances formed by NAND gate PMOS circuits 311 and NOR gate NMOS circuits 322 drops the voltage of the modulation signal output to optical transmitter 340 from $V_{DD}$ to a relative lower voltage level after the first bit 1 on TAP0 based on the resulting voltage divider ratio.

Conversely, for transmission of two or more consecutive 0 bits on the main modulation signal TAP0 (e.g., TAP0 previous bit 0, TAP0 current bit 0, and TAP1B current bit 1), EDGERATE_CONTROL_L will be able to control NOR gate NMOS circuits 312 of edge rate controller 310 and EQ_CONTROL_H will be able to control NAND gate PMOS circuits 321 of equalization controller 320 simultaneously. The voltage divider resistances formed by NAND gate PMOS circuits 311 and NOR gate NMOS circuits 322 pulls the voltage of the modulation signal output to optical transmitter 340 from $V_{SS}$ up to a relative higher voltage level after the first bit 0 on TAP0 based on the resulting voltage divider ratio.

Figure 4A:
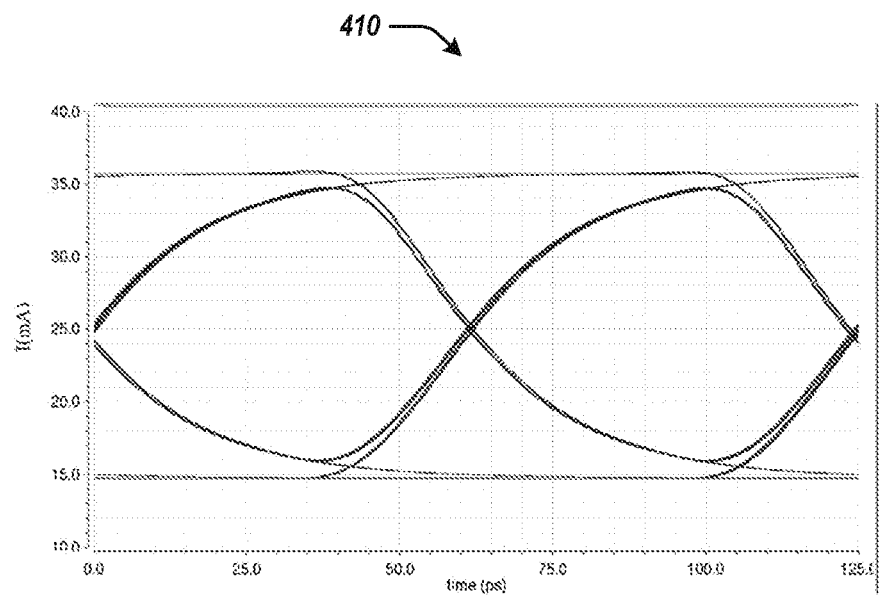
FIGS. 4(a) and 4(b) are example eye diagrams depicting example modulation signal outputs from an optical driver circuit without and with equalization, respectively.
Figure 4B:
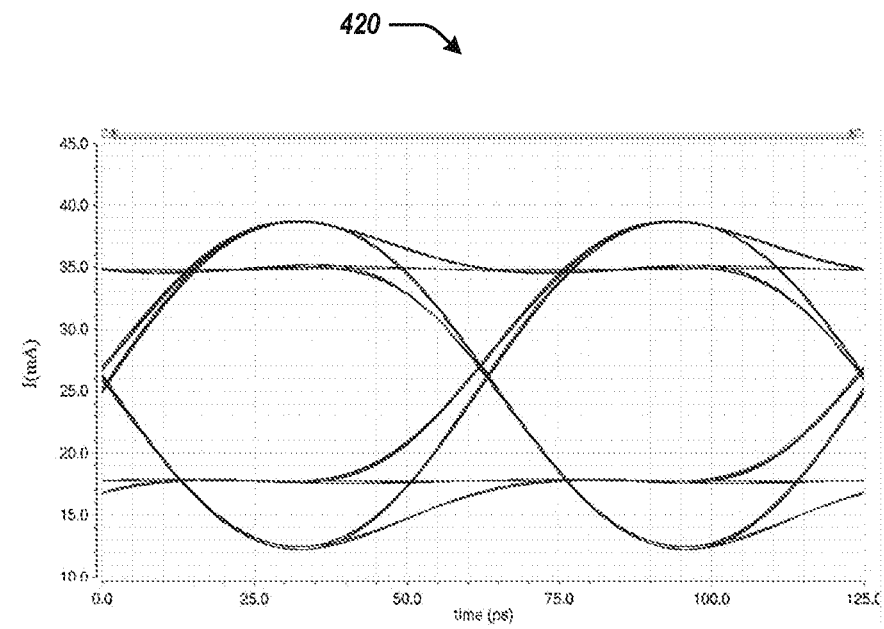

FIGS. 4(a) and 4(b) are example eye diagrams depicting example modulation signal outputs from an optical driver circuit (e.g., optical driver circuit 100 of FIG. 1 and/or main driver circuit 300 of FIG. 3). Eye diagram 410 depicts an example modulation signal output without equalization and, therefore, without pre-emphasis. As shown in FIG. 4(a), the modulation signal output swing ranges from around 15 mA to around 35 mA with a cross-over point around 25 mA. As the modulation signal output modulates, the rising edge transitions from around 15 mA and settles out around 35 mA whereas the falling edge transitions from around 35 mA and settles out 15 mA.

Eye diagram 420 depicts an example modulation signal output with equalization. As shown in FIG. 4(b), the rising edge of the modulation signal output initially transitions to 39 mA before settling out around 35 mA. The transition to 39 mA and then to 35 mA is pre-emphasis on the rising edge of the modulation signal output that lasts for about one clock cycle before settling out at 35 mA. Similarly, on the falling edge, the modulation signal output initially transitions to around 12 mA before rising slightly and settling out at 18 mA after one clock cycle.

Figure 5:
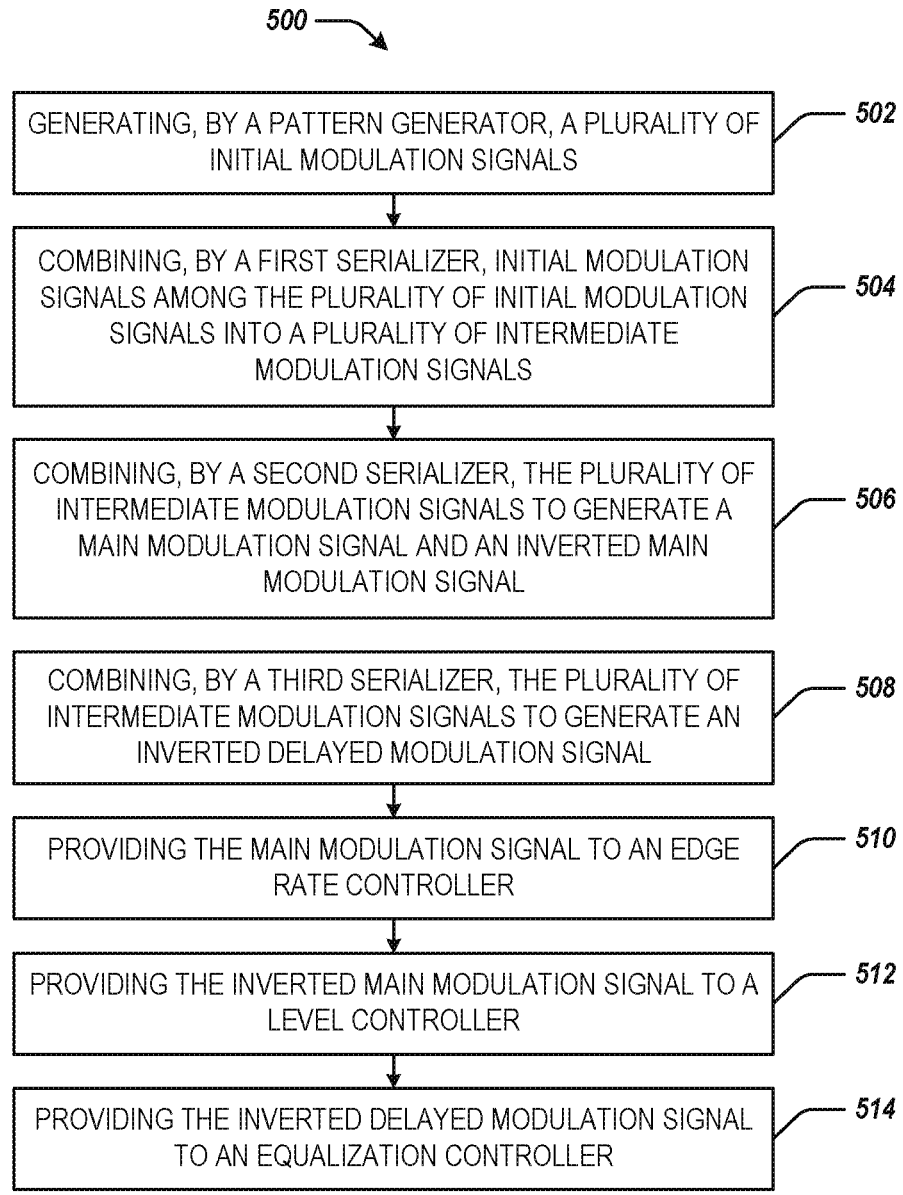
FIG. 5 is a flowchart of an example method for generating modulation signal outputs of optical driver circuits.

FIG. 5 is a flowchart depicting an example method 500 for generating modulation signal outputs of optical driver circuits. Method 500 may, for example, be implemented by example optical driver circuit 100 of FIG. 1, example pre-driver circuit 200 of FIG. 2, main driver circuit 300 of FIG. 3, and/or other optical driver circuits. In some examples, steps of method 500 may be executed substantially concurrently or in a different order than shown in FIG. 5. In some examples, method 500 may include more or less steps than are shown in FIG. 5. In some examples, some of the steps of method 500 may be ongoing or repeat.

At block 502, method 500 may include generating, by a pattern generator, a plurality of initial modulation signals. As an example, pattern generator 111 of FIG. 1 and/or pattern generator 202 of FIG. 2 may implement block 502.

At block 504, method 500 may include combining, by a first serializer, initial modulation signals among the plurality of initial modulation signals into a plurality of intermediate modulation signals. As an example, serializer 112 of FIG. 1 and/or serializer 204 of FIG. 2 may implement block 504.

At block 506, method 500 may include combining, by a second serializer, the plurality of intermediate modulation signals to generate a main modulation signal and an inverted main modulation signal. As an example, serializer 112 of FIG. 1 and/or serializer 206 of FIG. 2 may implement block 506.

At block 508, method 500 may include combining, by a third serializer, the plurality of intermediate modulation signals to generate an inverted delayed modulation signal. As an example, serializer 112 of FIG. 1 and/or serializer 210 of FIG. 2 may implement block 508. In some examples, combining the plurality of intermediate modulation signals to generate the inverted delayed modulation signal may include delaying the inverted delayed modulation signal by one clock cycle from the main modulation signal.

At block 510, method 500 may include providing the main modulation signal to an edge rate controller. As an example, serializer 112 of FIG. 1 and/or serializer 206 of FIG. 2 may implement block 510.

At block 512, method 500 may include providing the inverted main modulation signal to a level controller. As an example, serializer 112 of FIG. 1 and/or serializer 206 of FIG. 2 may implement block 512.

At block 514, method 500 may include providing the inverted delayed modulation signal to an equalization controller. As an example, serializer 112 of FIG. 1 and/or serializer 210 of FIG. 2 may implement block 512.

Figure 6:
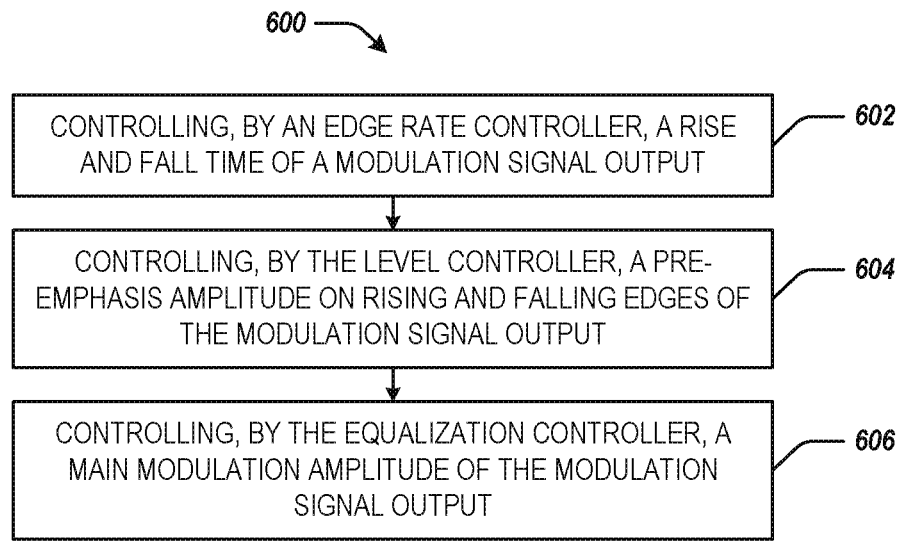
FIG. 6 is a flowchart of an example method for generating modulation signal outputs of optical driver circuits.

FIG. 6 is a flowchart depicting an example method 600 for generating modulation signal outputs of optical driver circuits. Method 600 may, for example, be implemented by example optical driver circuit 100 of FIG. 1, example pre-driver circuit 200 of FIG. 2, main driver circuit 300 of FIG. 3, and/or other optical driver circuits. In some examples, steps of method 600 may be executed substantially concurrently or in a different order than shown in FIG. 6. In some examples, method 600 may include more or less steps than are shown in FIG. 6. In some examples, some of the steps of method 600 may be ongoing or repeat.

At block 602, method 600 may include controlling, by an edge rate controller, a rise and fall time of a modulation signal output. As an example, main driver circuit 120 of FIG. 1 and/or edge rate controller 310 of FIG. 3 may implement block 602. In some examples, the edge rate controller may control the rise and fall time of the modulation signal output based on a main modulation signal (e.g., main modulation signal TAP0 of FIG. 2 and FIG. 3).

At block 604, method 600 may include controlling, by a level controller, a pre-emphasis amplitude on rising and falling edges of the modulation signal output. As an example, level controller 121 of FIG. 1 and/or level controller 330 of FIG. 3 may implement block 604. In some examples, the level controller may control the pre-emphasis amplitude of rising and falling edges of the modulation signal output based on an inverted main modulation signal tap (e.g., inverted main modulation signal TAP0B).

At block 606, method 600 may include controlling, by an equalization controller, normal modulation amplitudes of the modulation signal output. As an example, equalization controller 122 of FIG. 1 and/or equalization controller 320 of FIG. 3 may implement block 606. In some examples, the equalization controller may control the normal modulation amplitudes of the modulation signal output based on an inverted delayed modulation signal tap (e.g., inverted delayed modulation signal TAP1B). In some examples, the equalization controller may control normal modulation amplitudes of the modulation signal output using feed forward equalization. In some examples, the equalization controller may control the normal modulation amplitudes of the modulation signal output by feed forward equalization to remove the pre-emphasis of the modulation signal output using the inverted delayed modulation signal.

The foregoing disclosure describes a number of example implementations of optical driver circuits and methods for generating modulation signal outputs of optical driver circuits. The disclosed examples may include optical driver circuits and methods for generating modulation signal outputs of optical driver circuits. For purposes of explanation, certain examples are described with reference to the components illustrated in FIGS. 1-4(a) and 4(b). The functionality of the illustrated components may overlap, however, and may be present in a fewer or greater number of elements and components. Moreover, the disclosed examples may be implemented in various environments and are not limited to the illustrated examples.

Further, the sequence of operations described in connection with FIGS. 5 and 6 are an examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

The invention claimed is:

1. An optical driver circuit, comprising:
   a pre-driver circuit, including a pseudorandom pattern generator to generate a plurality of initial modulation signals, and a first serializer to combine initial modulation signals into a plurality of intermediate modulation signals;
   a second serializer to combine the plurality of intermediate modulation signals to generate a main modulation signal and an inverted delayed modulation signal; and
   a main driver circuit to generate a modulation signal output, including:
     a level controller to control amplitudes of pre-emphasis on rising and falling edges of the modulation signal output; and
     an equalization controller to transition the modulation signal output from the pre-emphasis amplitudes to main modulation amplitudes using the inverted delayed main modulation signal.

2. The optical driver circuit of claim 1, wherein the inverted delayed modulation signal is tapped off of the main modulation signal.

3. The optical driver circuit of claim 1, wherein the inverted delayed modulation signal is delayed by one clock cycle from the main modulation signal.

4. The optical driver circuit of claim 3, wherein the equalization controller uses feed forward equalization to transition the modulation signal output from the pre-emphasis amplitudes to the main modulation amplitudes.

5. The optical driver circuit of claim 1, wherein the main driver circuit includes:
an edge rate controller to control rise times and fall times of the modulation signal output.

6. The optical driver circuit of claim 5, wherein the level controller, the equalization controller, and the edge rate controller form a voltage divider for controlling the modulation signal output.

7. The optical driver circuit of claim 1, wherein the pre-driver circuit includes:
a third serializer to:
combine the plurality of intermediate modulation signals; and
delay the combined plurality of intermediate modulation signals to generate a delayed modulation signal; and
a fourth serializer to:
combine the plurality of intermediate modulation signals;
delay the combined plurality of intermediate modulation signals; and
invert the delayed modulation signal to generate the inverted delayed modulation signal.

8. An optical driver circuit, comprising:
a level controller to pre-emphasize rising and falling edges of a modulation signal output to an optical transmitter;
an equalization controller to remove the pre-emphasis from the modulation signal output using an inverted delayed modulation signal; and
an edge rate controller to control a rise and fall time of the modulation signal output;
wherein the level controller, the equalization controller, and the edge rate controller each include a plurality of negative-AND (NAND) gate p-channel metal-oxide-semiconductor field-effect transistor (PMOS) circuits and a plurality of negative-OR (NOR) gate n-channel metal-oxide-semiconductor field-effect transistor (NMOS) circuits forming a voltage divider.

9. The optical driver circuit of claim 8, wherein the voltage divider formed by the plurality of NAND gate PMOS circuits and the plurality of NOR gate NMOS circuits included in the level controller, the equalization controller, and the edge rate controller is to provide the modulation signal output to a cathode of an optical transmitter.

10. The optical driver circuit of claim 8, comprising:
a pre-driver circuit to:
generate a main modulation signal and an inverted main modulation signal;
provide the main modulation signal as input to the plurality of NAND gate PMOS circuits and the plurality of NOR gate NMOS circuits included in the edge rate controller; and
provide the inverted main modulation signal as input to the plurality of NAND gate PMOS circuits and the plurality of NOR gate NMOS circuits included in the level controller.

11. The optical driver circuit of claim 8, wherein the inverted delayed modulation signal is delayed 180 degrees from the main modulation signal using clock phase shifting.

12. The optical driver circuit of claim 8, wherein the equalization controller is to remove the pre-emphasis from the modulation signal output using feed forward equalization (FFE).

13. The optical driver circuit of claim 12, wherein the equalization controller is to remove the pre-emphasis from the modulation signal output using FFE by combining the inverted delayed modulation signal with the main modulation signal.

14. A method for generating a modulation signal output of an optical driver circuit, comprising:
generating, by a pattern generator, a plurality of initial modulation signals;
combining, by a first serializer, initial modulation signals among the plurality of initial modulation signals into a plurality of intermediate modulation signals;
combining, by a second serializer, the plurality of intermediate modulation signals to generate a main modulation signal and an inverted main modulation signal;
combining, by a third serializer, the plurality of intermediate modulation signals to generate an inverted delayed modulation signal;
providing the main modulation signal to an edge rate controller;
controlling, by the edge rate controller, a rise and fall time of the modulation signal output;
providing the inverted main modulation signal to a level controller;
controlling, by the level controller, a pre-emphasis amplitude on rising and falling edges of the modulation signal out;
providing the inverted delayed modulation signal to an equalization controller; and
controlling, by the equalization controller, normal modulation amplitudes of the modulation signal output.

15. The method of claim 14, wherein controlling normal modulation amplitudes of the modulation signal output comprises controlling normal modulation amplitudes of the modulation signal output using feed forward equalization.

16. The method of claim 15, wherein controlling normal modulation amplitudes of the modulation signal output using feed forward equalization comprises removing pre-emphasis of the modulation signal output using the inverted delayed modulation signal.

17. The method of claim 14, wherein combining the plurality of intermediate modulation signals to generate the inverted delayed modulation signal comprises delaying the inverted delayed modulation signal by one clock cycle from the main modulation signal.

18. An optical driver circuit, comprising:
a level controller to pre-emphasize rising and falling edges of a modulation signal output to an optical transmitter;
an equalization controller to remove the pre-emphasis from the modulation signal output using an inverted delayed modulation signal;
an edge rate controller to control a rise and fall time of the modulation signal output;
wherein the level controller, the equalization controller, and the edge rate controller each include a plurality of negative-AND (NAND) gate p-channel metal-oxide-semiconductor field-effect transistor (PMOS) circuits and a plurality of negative-OR (NOR) gate n-channel metal-oxide-semiconductor field-effect transistor (NMOS) circuits; and a pre-driver circuit to:
   generate a main modulation signal and an inverted main modulation signal;
   provide the main modulation signal as input to the plurality of NAND gate PMOS circuits and the plurality of NOR gate NMOS circuits included in the edge rate controller; and
   provide the inverted main modulation signal as input to the plurality of NAND gate PMOS circuits and the plurality of NOR gate NMOS circuits included in the level controller.

19. The optical driver circuit of claim 18, wherein the inverted delayed modulation signal is delayed 180 degrees from the main modulation signal using clock phase shifting.

20. The optical driver circuit of claim 18, wherein the equalization controller is to remove the pre-emphasis from the modulation signal output using feed forward equalization (FFE).

* * * * *